United States Patent [19]

Fossi et al.

[11] 4,372,922
[45] Feb. 8, 1983

[54] PROCESS FOR THE RECOVERY OF INDIUM

[76] Inventors: Paolo Fossi, 52, avenue de Cressac - La Commanderie des Templiers, 78310 Elancourt, France; Emilio Sambarino, Viale Gramsci 194, 88074 Crotone (CZ), Italy

[21] Appl. No.: 291,837

[22] Filed: Aug. 10, 1981

Related U.S. Application Data

[63] Continuation of Ser. No. 74,506, Sep. 11, 1979, abandoned.

[30] Foreign Application Priority Data

Sep. 11, 1978 [FR] France ............... 78 26027

[51] Int. Cl.$^3$ ............................................. C01G 15/00
[52] U.S. Cl. ................................. 423/112; 75/101 BE
[58] Field of Search ............ 423/112, DIG. 14; 75/101 BE

[56] References Cited

U.S. PATENT DOCUMENTS 2,238,437  4/1941  Zischkau .................. 75/121
2,241,438  5/1941  Zischkau et al. .......... 75/121

FOREIGN PATENT DOCUMENTS 2297925 10/1977 France .
2334756  8/1978 France .
 59276  2/1970 Poland .
128613 11/1959 U.S.S.R. ............... 423/112

OTHER PUBLICATIONS

Akerman et al., *Chemical Abstracts*, vol. 73, 1970, #37033w, p. 90.
Levin et al., "Doklady Academii Nauk SSSR", vol. 139, No. 1, 1961, pp. 158–159.

*Primary Examiner*—Herbert T. Carter
*Attorney, Agent, or Firm*—Fleit & Jacobson

[57] ABSTRACT

The invention is directed to a process for the recovery of indium contained as an impurity in aqueous solutions in concentrations less than 1 gram per liter, by extracting indium from an aqueous solution by contacting with a first phase, which consists of a diester of phosphoric acid. The diester of phosphoric acid extracts indium in proportionally greater quantities relative to the extraction of other metals present in the aqueous solution. The extracted indium is stripped from the first phase by contacting the first phase with a stripping phase.

22 Claims, No Drawings

PROCESS FOR THE RECOVERY OF INDIUM

This is a continuation of application Ser. No. 74,506 filed Sept. 11, 1979, now abandoned.

This invention relates to a process for the recovery of indium contained as impurity in the aqueous solutions of other metals.

The present invention is more particularly concerned with a process to extract indium selectively with respect to the other metals.

It is known that indium is often associated in traces to different categories of sulphide lead, zinc and copper ores and especially with sphalerites.

Three quarters of the sphalerites extracted each year serve to produce zinc in the electrolytic way.

Therefore, after having been enriched by flotation, the sphalerites are roasted to give a zinc oxide which is itself counter-current leached by sulphuric acid. The sulphuric solution issuing from leaching is virtually neutral and contains about 90% of the zinc originally present in the oxide, whereas practically all the indium is in the residue with the lead, the silica and the zinc ferrite formed at roasting.

These leaching residues, sometimes referred to as "cake Moore" or "cake Oliver", are relatively rich in zinc and are often retreated in order to recover the contained metal values.

A first processing for these leaching residues consists in treating them in a rotary kiln (or a cupola furnace) where part of the non-ferrous metals are reduced, vaporized and collected as oxides whereas the iron and the silica are eliminated as slag.

A noteworthy part of the indium is to be found in the mixture of oxides.

These oxides are generally reprocessed by means of a sulphuric solution which allows the dissolution of zinc, cadmium and indium, whereas the lead forms an unsoluble residue of lead sulphate.

The indium contained in these solutions is only rarely recovered, since no simple and selective process for the recovery of the indium held in such solutions has been known prior to the present invention.

Another way of treating sulphuric leach residues consists in leaching the latter by sulphuric acid at a greater temperature and concentration than for the previous treatment. This process is generally referred to as "hot strong leach" (HSL). This technique makes it possible to dissolve the ferrite, the zinc and the indium contained in the residue, whereas the lead and the silica remain non-soluble and form a new residue.

The acid sulphuric solutions issuing from the HSL process are treated to recover the metals they contain, often by reduction then precipitation of the iron in form of goethite, or by precipitation in presence of alkaline ions, of a complex salt of sulfate ions, ferric hydroxide and alkaline ions called jarosite.

Both these techniques cause the indium to be lost, generally by precipitation together with jarosite or goethite.

Therefore one of the aims of the present invention is to provide a process for recovering the indium contained in sulphuric leach solutions.

This invention is furthermore aimed at providing a selective process of indium extraction with respect to the metals contained in indium-bearing sulphuric leach solutions.

These and other aims that will appear later are achieved by means of the process for recovering the indium contained at oxidation state III and as an impurity -i.e. at a concentration less than one gram per liter approximately- in aqueous solutions of other metals, characterized by the following successive stages:

(a) the indium is extracted by putting the aforementioned aqueous solution into contact with a first phase, liquid or solid, that contains as an active group a diester of phosphoric acid;

(b) the indium of the first phase or extracting phase is stripped by contacting the latter with a second phase, called stripping phase.

The first phase of stage (a) may be constituted either by a diester of orthophosphoric acid dissolved in an organic diluent, which can be an aliphatic or an aromatic hydrocarbon or a mixture of both, or preferably by a stationary phase, as for example a cross-linked polymer, on which is fixed, by grafting or any other appropriate means, an active group constituted by a diester of orthophosphoric acid. In the first case, the preferred diesters are those formed by heavy alcohols with a number of carbon atoms comprised between 6 and 12, these alcohols being linear or ramified. The preferred diester is di-2-ethyl-hexyl phosphoric acid. In the second case, one may use the product marketed by the Bayer Company under the trade mark Lewatit OC 1026 as a stationary phase with a dialcoyl phosphoric acid active constituent.

It is worth mentioning at this stage of the description that, although the affinity of indium for di-2-ethyl-hexyl phosphoric acid (D2EHPA) was theoretically studied in the two articles below: "Kinetics of the Extraction of Indium by Di-2-Ethylexylphosphoric Acid from Sulphate Solutions" (A. I. Potapova and Yu. B. Kletenik. Izvest. Sibir. Otdel. Akad. Nauk SSSR, Sept. 1973) and "The Extraction of Indium (III), Lanthanum (III) and Bismuth (III) from Sulphuric Acid Solutions by di (2-ethylhexyl-) phosphoric acid" (T. Sato, Journal of Inor. Nucl. Chem., volume 37, No. 6, June 1975), it is particularly surprising that the extraction of indium be selective with respect to the metals held in the sulphuric leach solutions, since the diesters of orthophosphoric acid are generally considered to be good extractants of zinc, iron and most of the cationic trivalent elements. In particular, ferric iron is known to form with di-2-ethyl-hexyl-phosphoric acid (D2EHPA) so stable a compound that it cannot be stripped in sulphuric medium and can only partly be displaced in presence of highly concentrated hydrochloric acid (5 to 10 N).

A characteristic of the present invention is that the process is particularly well adapted to the treatment of sulphate solutions containing 5 to 300 grams per liter and preferably 50 to 200 grams per liter of sulphate ions.

The acidity of these solutions may range from 0.01 to 5 N and preferably from 0.05 to 2 N.

The process according to the present invention allows the selective extraction with respect to zinc, iron and arsenic, in as much as the concentrations in zinc, ferrous, ferric and arsenic ions do not exceed respectively 180 grams per liter, 50 grams per liter, 5 and preferably 1 gram per liter, 10 grams per liter.

This selectivity of indium extraction by the diesters of orthophosphoric acid is the more surprising as it is possible to fix the indium, even if present as traces (less than 100 milligrams per liter), from solutions containing about 100 grams per liter of zinc and up to about 10 grams per liter of iron, with an indium recovery rate exceeding 90%.

This fixation is selective despite the known affinity of D2EHPA for iron (III) and the other cations of the metal (III) type such as aluminium, bismuth, gallium, antimony and arsenic.

Without this interpretation being restrictive on the invention, it appears that said selectivity may be ascribed to kinetical phenomena. This is why it is advisable to limit the time of contact between the extracting phase and the indium-bearing solution if the latter contains more than 1 gram per liter of iron (III). Then the extraction process is stopped as soon as the indium content of the solution decreases below a value chosen beforehand. This value depends on the rank of the stage when the extraction is performed in several stages and on the number of stages.

The operation is generally conducted so that on completion of stage (a) the indium content of the solution is comprised between 1 and 10 mg/l.

The influence of the parameters likely to affect the kinetics, such as temperature, concentration of leaching solution or composition of extracting phase, is illustrated by the examples 1 to 13.

When the ferric ions content is too high and raises above the earlier indicated boundaries, it is possible to reduce it by contacting the solution with an agent liable to reduce ferric iron or by adding it. Among these agents, one may quote metallic iron, sulphurous acid and the derived salts, as well as unroasted sulphide concentrates.

The invention is preferably applied while using as an extractant for stage (a) a stationary phase similar to that employed in the additional certificate No. 2,334,756 to the French Pat. No. 2,297,925, so to fix the arsenic, aluminium, chromium and zinc contained as impurities in nickel chloride solutions.

In addition to the overall advantages connected with the use of stationary rather than liquid organic phases as reagents for the treatment of diluted solutions, the preference is warranted in this particular case by the possibility to operate at a higher temperature and without any diluent.

It has indeed been observed that the diluents which are usually added to the orthophosphoric diesters in order to achieve stage (a) by the liquid-liquid extraction technique had a detrimental effect on the selectivity of separation and the extraction yield.

Example 6 shows the unpredictable but always detrimental influence of various conventional diluents. In all cases, the best performances, as well in terms of selectivity as of yield, are achieved dispensing with any kind of diluent, hence the interest of a stationary phase by means of an inert substrate entailing no dilution.

Another surprising characteristic of the present invention consists in the fact that despite the great affinity of orthophosphoric diesters for indium, which explains the preferential fixation of the latter with respect to the other metals present in sulphuric leach solutions, the stripping from the first phase or extracting phase of stage (a) is relatively easy and does not necessarily imply that the second phase or stripping phase be very acid. The only requirements to be complied with are a minimal concentration in halides in this second phase equal to two ions-grams per liter, and preferably equal to four ions-grams per liter, and an acidity of this second phase advantageously ranging from 0.1 to 10 N and preferably from 1 to 2 N.

The halide ions may be introduced in form of ammonium, alkaline or alkaline-earth metal salts.

A preferential way to carry the invention into effect is to use as a second phase or stripping phase at stage (b) an aqueous solution of alkaline metals, bromides or chlorides 3 or 4 times molar containing 1 to 2 moles per liter of acid, preferably hydrochloric.

Example 9 illustrates how the use of brines composed of alkaline or alkaline-earth chlorides enables to achieve a better efficiency in comparison to the use of hydrochloric acid alone.

The other alkaline or alkaline-earth halides or their mixtures could be equally suitable.

Once some amount of ferric iron has been extracted together with the indium, it is possible to perform a selective stripping of the latter by using brines with an acidity below 2 N as a stripping phase. In this case, example 13 highlights the improved performances that may be obtained by replacing all or part of the chloride ions by bromide ions. When iodide ions are used instead of chloride ions, the stripping is appreciably slower but the selectivity remains high.

EXAMPLE 1: EXTRACTION OF INDIUM BY MEANS OF DI-2-ETHYL-HEXYL PHOSPHORIC ACID IN AN INERT HYDROCARBONATED DILUENT

| Starting solution: | $ZnSO_4$ expressed in zinc: 90 g/l |
| --- | --- |
| | $H_2SO_4$: 1 N |
| | $Fe^{++}$: 7 g/l |
| | In: 0.035 g/l. |
| Solvent: D2EHPA, 20% in weight in desaromatized kerosene. | |

The same organic phase being contacted three times successively with 2.5 times its volume of starting solution, the following results are obtained, expressed in mg/l of indium.

| | 1st contact | | 2nd contact | | 3rd contact | |
| --- | --- | --- | --- | --- | --- | --- |
| | input | output | input | output | input | output |
| Aqueous phase | 35 | 3.4 | 35 | 3.7 | 35 | 4.0 |
| Organic phase | 0 | 79 | 79 | 158 | 158 | 235 |

This example shows that the indium is extracted with a recovery yield of 90% approximately.

EXAMPLE 2

For an aqueous phase containing 0.6 N of sulphuric acid and a solvent constituted by a solution of 20% D2EHPA in Escaid 100, the following values are obtained, which enable to trace the extraction isotherm (indium concentrations expressed in g/l).

| Aqueous phase | 0.05 | 0.10 | 0.250 | 0.800 | 0.960 |
| --- | --- | --- | --- | --- | --- |
| Organic phase | 9.0 | 0.75 | 10.95 | 11.75 | 11.90 |

EXAMPLE 3

The previous isotherm depends on the sulphuric acid concentration of the treated solution; yet it is observed that the concentration range for which extraction remains possible is very wide: a series of comparative tests with varying acid concentrations gave the following results:

| Normality H$_2$SO$_4$ | g/l of indium in organic phase |
|---|---|
| 0.6 | 10.45 |
| 0.99 | 9.86 |
| 2.28 | 8.14 |

The fixation capacity of the extracting phase is found to be only slightly affected by an increased acidity. Under the conditions of acid concentration below, the yields were:

| Normality H$_2$SO$_4$ | Extraction yield of indium | of iron |
|---|---|---|
| 0.2 N | >99% | 23% |
| 0.5 N | >99% | 18% |
| 1.0 N | >99% | 14% |
| 2.0 N | >99% | 14% |
| 4.0 N | 96% | 18% |

EXAMPLE 4

Several contacts of a sulphate leaching phase of the following composition:

| In (III): | 1.92 g/l |
|---|---|
| Fe (III): | 1.27 g/l |
| Zn (II): | 70.00 g/l |
| H$_2$SO$_4$: | ½ mole/l | are effected with an extracting phase consisting of a solution of 20% D2EHPA in desaromatized kerosene, so to point out how the selectivity of extraction with respect to iron decreases as the duration of extraction is exceedingly prolonged.

| Test | Indium Concentration in extracting phase | Selectivity: Extracted In concentration / Extracted Fe concentration |
|---|---|---|
| 1 | 3.8 g/l | 27.0 |
| 2 | 8.0 g/l | 23.0 |
| 3 | 9.0 g/l | 8.9 |
| 4 | 10.0 g/l | 7.4 |

EXAMPLE 5: SELECTIVITY OF INDIUM (III) EXTRACTION WITH RESPECT TO THE OTHER CONSTITUENTS OF THE SOLUTION, IN PARTICULAR THE CATIONS OF THE METAL (III) TYPE

A sulphate leaching solution of the following composition:

| Zinc (II): | 100 g/l |
|---|---|
| H$_2$SO$_4$: | 0.5 molar |
| In (III): | 0.370 g/l |
| Fe (II): | 4.95 g/l |
| Ga (III): | 0.25 g/l |
| Al (III): | 0.405 g/l |
| As (III): | 0.27 g/l |
| Sb (III): | 0.385 g/l |
| Bi (III): | 0.31 g/l |
| Cu (II): | 0.37 g/l | is contacted with an organic extraction phase consisting of a solution of 20% D2EHPA in Solvesso 150. After phase separation, the following extraction percentages are obtained respectively:

| In: | 85% |
|---|---|
| Fe: | 3% |
| Ga: | <0.1% |
| Al: | 1% |
| As: | <0.1% |
| Sb: | 19% |
| Bi: | 5% |
| Cu: | 3% |
| Zn: | <0.1%. |

If the aromatic diluant is replaced by an aliphatic diluent or if the diluant is omitted, an increment in indium extraction is recorded but the same does not hold perceptibly for the other constituents.

If the raw material is a sulphate leach solution containing iron at oxidation state (III) as shown hereunder:

| In: | 0.38 g/l |
|---|---|
| Fe: | 2.70 g/l |
| Ga: | 0.315 g/l |
| Al: | 0.400 g/l |
| As: | 0.340 g/l |
| Sb: | 0.380 g/l |
| Bi: | 0.390 g/l |
| Cu: | 0.395 g/l |
| Zn: | 100 g/l |
| H$_2$SO$_4$: | 0.5 molar. |

The extraction percentages under the same conditions as preceedingly are indicated beneath:

| In: | 90% |
|---|---|
| Fe: | 13% |
| Ga: | <1% |
| Al: | <1% |
| As: | 18% |
| Sb: | 23% |
| Bi: | 5% |
| Cu: | <1% |
| Zn: | <0.1%. |

Although the indium extracting percentage remains within the same order of magnitude, a slight diminution of the selectivity in presence of ferric iron is nevertheless observed.

EXAMPLE 6: EFFECT OF DILUANTS

An indium-bearing solution of the following composition:

| Indium: | 0.295 g/l |
|---|---|
| Iron$^{3+}$: | 2.600 g/l |
| Zinc: | 100 g/l |
| H$_2$SO$_4$: | 1 N | is contacted for 15 minutes at 20° C. with extracting phases respectively composed of:
  (a) a solution at 20% D2EHPA in Solvesso 150, diluent more than 90% aromatic
  (b) a solution at 20% D2EHPA in desaromatized kerosene, diluent more than 90% aliphatic
  (c) non-diluted D2EHPA.

The quantities of phosphoric diester are equal in the three cases and represent 1/10th in volume of the indium-bearing solution. After phase separation the following results are obtained:

| Test | Indium extraction yield | Extraction selectivity with respect to iron: $\frac{\text{In extraction yield}}{Fe^{3+} \text{ extraction yield}}$ |
|---|---|---|
| a | 88% | 5.87 |
| b | 98% | 3.63 |
| c | 99% | 8.25 |

EXAMPLE 7: EVIDENCE OF THE EFFECT OF TEMPERATURE ON THE EXTRACTION AND REEXTRACTION OF INDIUM

A leaching solution of the following composition:

| | |
|---|---|
| In III: | 0.772 g/l |
| Fe III: | 1.276 g/l |
| Zn II: | 100 g/l |
| $H_2SO_4$: | 0.5 molar | is contacted with an extraction phase consisting of a solution at 20% D2EHPA in Solvesso 150.

The results obtained are as follows:

| Test | Contact time | Temperature | Indium extraction yield | Selectivity of extraction: $\frac{\text{In concentration}}{\text{Fe concentration}}$ |
|---|---|---|---|---|
| 1 | 1 mn | 20° C. | 8 | 0.43 |
| 2 | 1 mn | 70° C. | 33 | 1.71 |
| 3 | 10 mn | 20° C. | 92 | 3.41 |
| 4 | 10 mn | 70° C. | 85 | 1.01 |
| 5 | 20 mn | 20° C. | 96 | 2.7 |
| 6 | 20 mn | 70° C. | 92 | 1.- |

Therefrom it may be derived that an optimal compromise does exist between temperature and contact time, which makes it possible to achieve maximum selectivity at extraction.

During stripping, the rise in temperature enables to reduce the stripping phase volumes and to obtain more concentrated solutions as shown by the results below, achieved with a loaded stationary phase scrubbed by hydrochloric acid, as for example 11 hereafter.

This loaded phase was contacted with a stripping phase constituted by an aqueous solution of NaCl 4 times molar + HCl once molar, respectively at 20° C. and 70° C.

| Temperature | % of eluated indium as a function of b.v. number | Ratio of In concentrations to stripping peaks |
|---|---|---|
| 20° C. | 2:33.5 | |
| | 4:78.5 | |
| | 8:94.5 | |
| | 12:98 | $\frac{(In)\ 70°\ C.}{(In)\ 20°\ C.} = 1.36$ |
| 70° C. | 2:66 | |
| | 4:90 | |
| | 8:95 | |
| | 12:98 | |

EXAMPLE 8: ELUTION OF THE INDIUM CONTAINED IN THE ORGANIC PHASE BY MEANS OF AN AQUEOUS SOLUTION OF HYDROCHLORIC ACID

As a function of acid concentration, the percentage of indium stripped at the first contact, when the two phases are present in equal volumes, is given in the following table:

| Normality of elution acid | % elution |
|---|---|
| 1 | 20.96 |
| 3 | 63.4 |
| 5 | 99.9 |

It thus appears that the recovery of indium is the better as the concentration in hydrogen and chloride ions is higher. It must be mentioned that the aqueous solutions of hydrochloric acid more than 5 N in normality give an elution percentage of about 99.9%.

EXAMPLE 9: COMPARISON OF VARIOUS BRINES OF ALKALINE OR ALKALINE-EARTH CHLORIDES AS STRIPPING AGENTS

Tests made in a separating funnel with equal volumes of aqueous and organic phase.

The table gives the percentage of stripped indium in one contact.

| Brine | Brine concentration in moles/l | Brine acidity in N 0.5 | 1.5 | 2 |
|---|---|---|---|---|
| LiCl | 3.5 | 67 | 85 | |
| | 7 | 95 | 92 | |
| KCl | 2 | 23.4 | 78.2 | |
| NaCl | 1.7 | 17.8 | | 93.3 |
| | 3.4 | 34.6 | | |
| $MgCl_2$ | 3 | 50 | 87.7 | |
| $CaCl_2$ | 1.5 | 32 | 79.8 | |
| | 3.4 | 80.4 | | |
| $NH_4Cl$ | 3 | 70.4 | | |
| | 3.75 | | 83.7 | |
| | 5 | 80.4 | 99.9 | |

Thus, using as stripping agents a brine of alkaline or alkaline-earth chlorides or of ammonium chloride, a better efficiency is achieved as compared with the use of hydrochloric acid alone.

EXAMPLE 10:

Starting solution:

| | |
|---|---|
| $ZnSO_4$: | 90 g/l expressed in zinc |
| $H_2SO_4$: | 0.6 N |
| In: | 0.170 mg/l |

Column of 500 ml approximately, 1 m high, filled with Lewatit OC 1026.

The speed of throughput of the solution corresponds to four times the apparent volume of the bed per hour.

On taking the solution issuing from the column at different percolation volumes, the following indium concentrations are obtained:

Volume of

| -continued | | | | | | | |
|---|---|---|---|---|---|---|---|
| percolation in liters | 0 | 4 | 5 | 10 | 13.5 | 16 | 19 | 20.5 |
| Indium concentration in mg/l | 160 | 2 | 5 | 56 | 89 | 120 | 145 | 160 |

The fixation capacity of the resin as treated in this example slightly exceeds 2 grams of indium per liter of stationary phase.

EXAMPLE 11: COMPLETE EXTRACTION CYCLE

An indium-bearing sulphate solution of the following composition

| | |
|---|---|
| Indium: | 0.169 g/l |
| Iron: | 1.0 g/l (entirely ferric) |
| Arsenic: | 1.5 g/l |
| Zinc: | 95 g/l |
| H$_2$SO$_4$: | 30 g/l |
| Copper: | 0.2 g/l | is contacted with a resin sold under the trade mark Lewatit OC 1026 up to the moment when the solution from the column contains more the 10 mg/l of indium. The flow-rate is about 4 b.v. ("bed volume") per hour. The indium concentration of the outcoming solution raises above 10 mg/hour only after 5 hours.

The mean composition of the solution leaving the column for the first five hours is:

| | |
|---|---|
| Indium: | 10 mg/l |
| Iron: | 0.78 g/l |
| Arsenic: | 1.48 g/l |
| Zinc: | 95 g/l |
| H$_2$SO$_4$: | 30 g/l |
| Copper: | 0.2 g/l. |

If the indium-bearing solution and the resin are maintained into contact, outcoming solutions with the following indium contents in mg/l are obtained:

| | |
|---|---|
| After 1 hour: <10 | After 8 hours: 117 |
| After 2 hours: <10 | After 9 hours: 123 |
| After 3 hours: <10 | After 10 hours: 140 |
| After 4 hours: <10 | After 11 hours: 150 |
| After 5 hours: 15 | After 12 hours: 154 |
| After 6 hours: 34 | After 13 hours: 157 |
| After 7 hours: 75 | After 14 hours: 160 |
| | After 15 hours: 160. |

The resin thus indium-loaded is scrubbed for one hour by making water containing some hydrochloric acid (pH 3) pass through the resin at a flow-rate of 2 b.v./hour.

The analysis of this scrub water is given hereafter:

| | Zn in g/l |
|---|---|
| After 15 minutes: | 50 |
| After 30 minutes: | 4.5 |
| After 45 minutes: | 0.8 |
| After 60 minutes: | 0.4 |

The scrubbed resin is stripped with a solution of hydrochloric acid (0.5 N) and sodium chloride (4 N) for 2 hours at a flow-rate of 1 b.v./hour. The analysis of the solution from the stripping stage is given hereafter:

| | |
|---|---|
| First 0.6 b.v.: | In = 10 mg/l (impregnation water) |
| 1.4 b.v.: | In = 3.1 g/l - Fe = 0.46 g/l - As = 0.3 g/l. |

The resin thus freed from indium has been washed by 2 b.v. of hydrochloric acid 5 N (flow-rate 2 b.v./hour). The analysis of wash waters is indicated hereafter:

| | |
|---|---|
| First 0.6 b.v.: | In = 0.4 g/l - Fe = 1.1 g/l (impregnation brine) |
| following 1.4 b.v.: | In = 0.14 g/l - Fe = 2.6 g/l. |

The resin thus washed is subjected to a rinse with 2 b.v. of pure water at pH 3 (flow-rate of 2 b.v./hour). The analysis of rinse waters is indicated hereafter:

| | |
|---|---|
| First 0.6 b.v.: | In < 10 mg/l - Fe = 0.32 g/l (impregnation HCl) |
| following 1.4 b.v.: | In < 10 mg/l - Fe < 10 mg/l. |

The stripping solution thus obtained (1.4 b.v.) is treated by soda 4 N on the basis of 15 g of soda per liter. The precipitate is filtered and dried.

The analysis of the filtrate and of the dry solide residue is given hereafter:

| Filtrate - pH: 5.5 | |
|---|---|
| Indium: | <10 mg/l |
| Iron: | <10 mg/l |
| Arsenic: | <10 mg/l |

Washed residue—5.75 g of dry product by liter of brine treated.
Analysis of the residue

| | |
|---|---|
| Indium: | 54% |
| Iron: | 8.1% |
| Arsenic: | 5.3% |
| Zinc: | 1.2% |
| Copper: | 0.01% |

The results obtained with an indium-bearing solution differring from this example only in as much as the sulphuric acid concentration is 60 g/l are roughly identical to those indicated above.

EXAMPLE 12: EXTRACTION IN PRESENCE OF FERROUS IRON

An indium-containing sulphate solution of the following composition:

| | |
|---|---|
| Indium: | 0.15 g/l |
| Iron$^{2+}$: | 0.87 g/l | is put into contact with a resin sold under the trade mark Lewatit OC 1026 up to the moment when the solution issuing from the column contains more than 10 mg/l of indium. The flow-rate averages 4 b.v./hour (bed volume). The indium concentration of the outcoming solution raises above 10 mg/hour only after 5 hours.

The mean composition of the solution that comes out of the column for the first five hours is:

| | |
|---|---|
| Indium | <10 mg/l |
| Iron$^{2+}$: | 0.87 g/l |

The resin thus indium-loaded is scrubbed for one hour by making very pure water pass through it at a flow-rate of 2 b.v./hour.

The scrubbed resin is stripped with a solution of hydrochloric acid (0.5 N) and sodium chloride (4 N) for 2 hours at a flow-rate of 1 b.v./hour. The analysis of the solution from the stripping stage is given in the following table:

| | Indium | Fe$^{2+}$ |
|---|---|---|
| 0.6 b.v. | — | — |
| 0.4 b.v. | 2.5 g/l | <2 mg/l |

This example shows that the selectivity of indium extraction is better when the indium-loaded solution contains ferrous ions, instead of ferric ions as it is the case for example 7.

EXAMPLE 13

An indium-loaded resin scrubbed by hydrochloric acid according to the scheme described for example 7 is similarly stripped, respectively with:

(a) a solution 4 times molar in NaCl+
once molar in HCl
(b) a solution 4 times molar in NaI+
once molar in HCl
(c) a solution 4 times molar in NaBr+
once molar in HCl The following results are obtained, that are worth comparing with stripping (d) achieved by HCl 8 N.

| Test | % eluated indium as a function of b.v. number | % eluated iron as a function of b.v. number | Elution selectivity Ratio of indium and iron concentrations at In elution peak |
|---|---|---|---|
| a | 2:33.5 | 4.2 | 8 |
| | 4:78.5 | 11.6 | |
| | 8:94.5 | 25.0 | |
| | 12:98 | 34.0 | |
| b | 2:2 | 21 | 27 |
| | 4:17 | 72 | |
| | 8:18 | 87 | |
| | 13:21 | 89 | |
| | 15:60 | 93 | |
| c | 2:32 | 3.0 | 35 |
| | 4:85 | 5.0 | |
| | 8:96 | 9.0 | |
| | 12:97 | 12.0 | |
| d | 2:48 | 46 | 1.7 |
| | 4:82 | 76 | |
| | 8:88 | 91 | |
| | 12:92 | 96 | |
| | 16:97 | 98 | |

These results highlight the increased selectivity of halide brines as compared with hydrochloric acid.

I claim:

1. Process for the selective recovery of indium from an aqueous sulfate solution of indium and other metals comprising at least zinc and iron, said indium being present in said aqueous sulfate solution as an impurity in a concentration of less than 1 gram per liter and in the III oxidation state, said aqueous sulfate solution having a hydrogen ion concentration between 0.01 and 5 N and a ferric iron concentration below 10 grams per liter, comprising the following successive stages:

(a) extracting said indium from said aqueous sulfate solution by contacting said aqueous sulfate solution with a first stationary phase consisting of an inert substrate having a non-diluted diester of orthophosphoric acid as the active group bound thereto, whereby indium is extracted into said first stationary phase in proportionally greater quantities relative to the extraction of said other metals; and (b) eluting said indium from said first stationary phase by contacting said first phase with a second stripping phase comprising an acidic aqueous solution.

2. Process according to claim 1, in which said aqueous solution contains sulphate ions within a concentration range from 5 to 300 grams per liter.

3. Process according to claim 2, in which the concentration of sulphate ions in said aqueous solution ranges from 50 to 200 grams per liter.

4. Process according to claim 1, in which the concentration of hydrogen ions in said aqueous solution is comprised between 0.05 and 2 N.

5. Process according to claim 1, in which said aqueous solution contains ferrous iron at a concentration less than 50 grams per liter.

6. Process according to claim 1, in which said aqueous solution contains ferric iron at a concentration less than 2 grams per liter.

7. Process according to claim 1, in which said aqueous solution contains arsenic at a concentration lower than 10 grams per liter.

8. Process according to claim 1, in which said aqueous solution contains zinc at a concentration lower than 180 grams per liter.

9. Process according to claim 1, in which at the end of said stage (a) the indium content of said aqueous solution is between 1 and 10 mg/l.

10. Process according to claim 1, in which the diester group of the phosphoric acid is in the diester form of orthophosphoric acid with an alcohol 6 to 12 carbon atoms.

11. Process according to claim 10, in which the diester of orthophosphoric acid is di-2-ethyl-hexyl phosphoric acid.

12. Process according to claim 1, in which the second phase of stage (b) contains at least two ions-grams of halide ions and from 0.5 to 10 ions-grams of hydrogen ions.

13. Process according to claim 12 in which the concentration in halide ions equals four ions-grams.

14. Process according to claim 12 in which the halide ions are at least partly introduced in the form of ammonium, alkaline or alkaline-earth halides.

15. Process according to claim 12, in which said halide ions chloride or bromide ions.

16. Process according to claim 15, in which said second phase furthermore contains hydrochloric acid.

17. Process according to claim 12, in which said second phase is an aqueous solution of alkaline bromides or chlorides three to four times molar containing 1 to 2 moles per liter of hydrochloric acid.

18. The process of claim 1, wherein the ferric iron in said aqueous sulfate solution is reduced prior to said extraction.

19. The process of claim 1, wherein ferric iron is present in the first phase and the second stripping phase comprises a brine containing a concentration of halides of at least 2 ions-grams per liter and has an acidity less than 2 N.

20. The process of claim 1, wherein the second stripping phase is a brine having an acidity from 1 to 2 N.

21. The process of claim 1, wherein the other metals further comprise gallium, aluminum, bismuth, arsenic and antimony in the III oxidation state.

22. The process of claim 1, wherein the inert substrate is a cross-linked polymer.

* * * * *